United States Patent
Takeda et al.

(10) Patent No.: US 11,178,627 B2
(45) Date of Patent: Nov. 16, 2021

(54) USER TERMINAL AND RADIO COMMUNICATION METHOD

(71) Applicant: NTT DOCOMO, INC., Tokyo (JP)

(72) Inventors: Kazuaki Takeda, Tokyo (JP); Kazuki Takeda, Tokyo (JP); Satoshi Nagata, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 5 days.

(21) Appl. No.: 16/609,965

(22) PCT Filed: May 2, 2017

(86) PCT No.: PCT/JP2017/017298
§ 371 (c)(1),
(2) Date: Oct. 31, 2019

(87) PCT Pub. No.: WO2018/203399
PCT Pub. Date: Nov. 8, 2018

(65) Prior Publication Data
US 2020/0059875 A1    Feb. 20, 2020

(51) Int. Cl.
*H04W 56/00*    (2009.01)
*H04L 5/00*    (2006.01)
*H04W 74/08*    (2009.01)

(52) U.S. Cl.
CPC ........ *H04W 56/001* (2013.01); *H04L 5/0048* (2013.01); *H04L 5/0053* (2013.01); *H04W 74/0833* (2013.01)

(58) Field of Classification Search
None
See application file for complete search history.

(56) References Cited

U.S. PATENT DOCUMENTS

| 2012/0320833 A1* | 12/2012 | Yamamoto | H04L 5/0053 370/328 |
| 2015/0181560 A1* | 6/2015 | Jamadagni | H04B 7/2621 370/329 |

(Continued)

FOREIGN PATENT DOCUMENTS

| JP | 2015-519815 A | 7/2015 |
| WO | 2009/019892 A1 | 2/2009 |
| WO | 2016/163010 A1 | 10/2016 |

OTHER PUBLICATIONS

3GPP TSG RAN WG1 Meeting #88bis; R1-1705702; "Views on wider bandwidth operations for NR" NTT Docomo, Inc. ; Apr. 3-7, 2017; Spokane, USA (4 pages).

(Continued)

*Primary Examiner* — Charles C Jiang
*Assistant Examiner* — Saad Khawar
(74) *Attorney, Agent, or Firm* — Osha Bergman Watanabe & Burton LLP

(57) ABSTRACT

The present invention is designed so that frequency bands can be used efficiently depending on what capabilities user terminals have. According to one aspect of the present invention, a user terminal includes a receiving section that receives a plurality of synchronization signal blocks, transmitted in each of a plurality of frequency bands in a specific frequency band, and a control section that controls transmission and/or receipt to use the specific frequency band, based on at least one of the plurality of synchronization signal blocks.

15 Claims, 17 Drawing Sheets

(56) References Cited

U.S. PATENT DOCUMENTS

| | | | | |
|---|---|---|---|---|
| 2016/0128011 | A1* | 5/2016 | Yang | H04W 4/70 370/329 |
| 2017/0126439 | A1* | 5/2017 | Yoshimoto | H04B 7/0639 |
| 2019/0297560 | A1* | 9/2019 | Gao | H04W 72/044 |
| 2020/0413359 | A1* | 12/2020 | Li | H04W 74/0808 |

OTHER PUBLICATIONS

3GPP TSG RAN WG1 Meeting #88bis; R1-1705319; "SS frequency raster for NR" Samsung; Apr. 3-7, 2017; Spokane, USA (4 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).

International Search Report issued in International Application No. PCT/JP2017/017298, dated Jul. 18, 2017 (3 pages).

Written Opinion issued in International Application No. PCT/JP2017/017298; dated Jul. 18, 2017 (4 pages).

Extended European Search Report issued in counterpart European Patent Application No. 17908373.8, dated Oct. 26, 2020 (8 pages).

Qualcomm Incorporated; "Synchronization signal bandwidth and multiplexing consideration"; 3GPP TSG-RAN WG1 NR AdHoc, R1-1700784; Spokane, USA; Jan. 16-20, 2017 (8 pages).

Qualcomm Incorporated; "PBCH design considerations"; 3GPP TSG-RAN WG1 NR AdHoc, R1-1700788; Spokane, USA; Jan. 16-20, 2017 (6 pages).

Office Action issued in the counterpart Korean Patent Application No. 10-2019-7034118, dated Apr. 27, 2021 (7 pages).

Office Action issued in the counterpart Japanese Patent Application No. 2019-516335, dated Jun. 29, 2021 (8 pages).

3GPP TSG RAN WG1 Meeting NR Ad-Hoc; R1-1700637 "Views on wider bandwidth operations for NR" NTT Docomo, Inc.; Spokane, USA; Jan. 16-20, 2017 (6 pages).

3GPP TSG RAN WG1 Meeting #88bis; R1-1704445 "Efficient Wider Bandwidth Operations for NR" MediaTek Inc. Spokane, USA; Apr. 13-17, 2017 (10 pages).

Office Action issued in Chinese Application No. 201780092629.5; dated Jul. 2, 2021 (9 pages).

\* cited by examiner

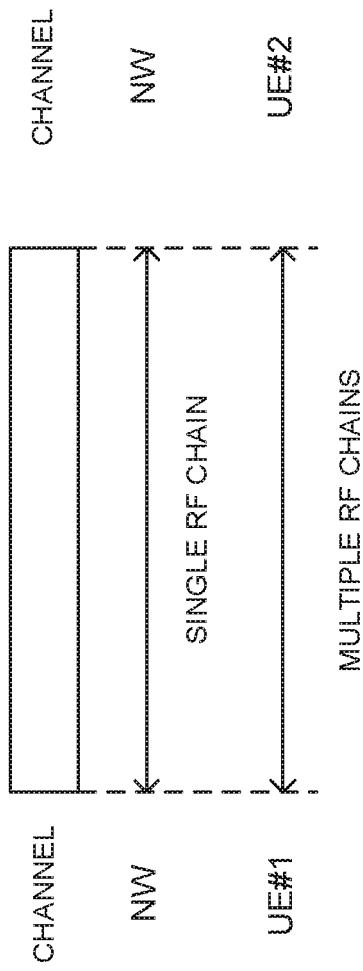
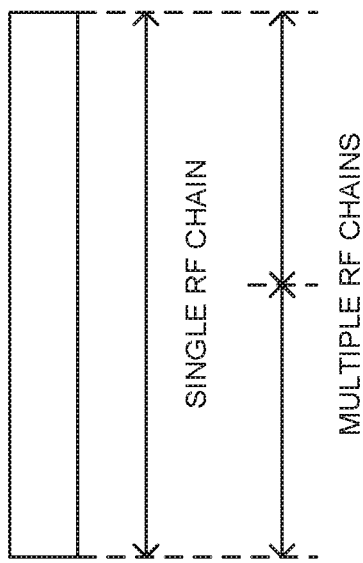
FIG. 1

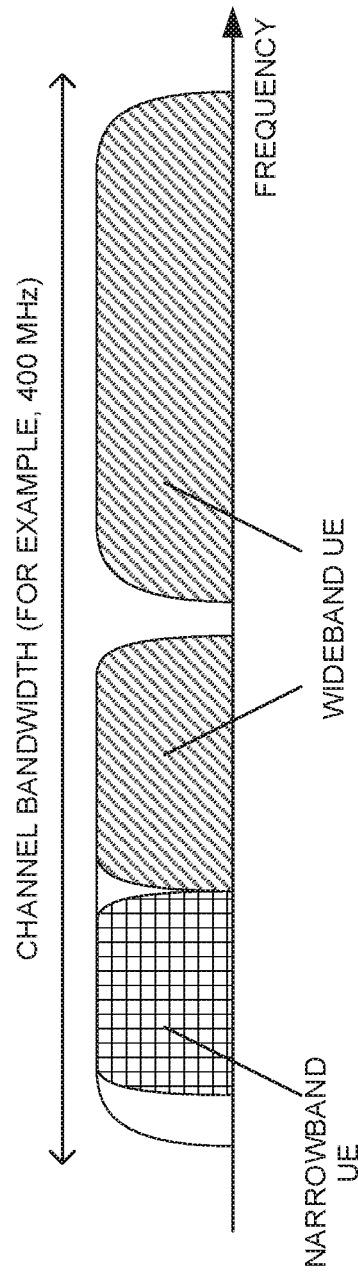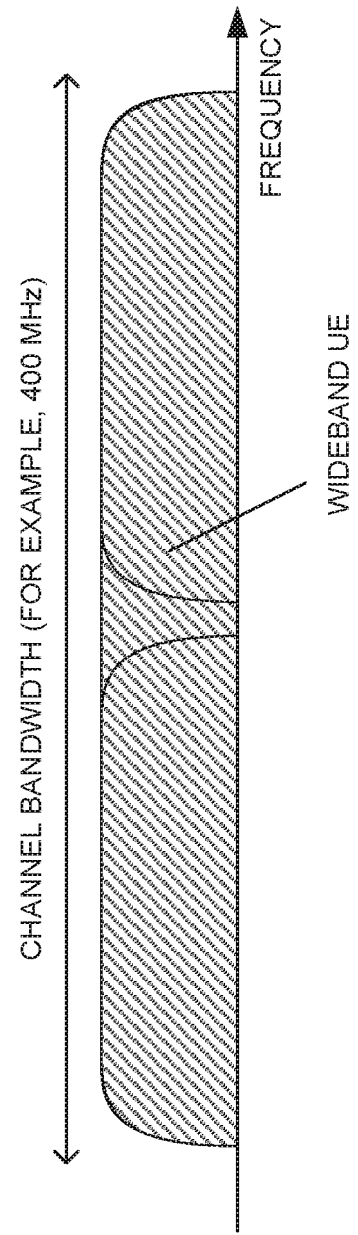

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted to provide widebands and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "NR (New Radio)," "NX (New radio access)," "FX (Future generation radio access)," "LTE Rel. 13," "LTE Rel. 14," "LTE Rel. 15" or later versions) are under study.

In LTE Rel. 10/11, carrier aggregation (CA) to integrate multiple component carriers (CC) is introduced in order to achieve broadbandization. Each CC is configured with the system bandwidth of LTE Rel. 8 as 1 unit. Furthermore, in CA, a number of CCs under the same radio base station (referred to as, for example, "eNB (evolved Node B)," "BS (Base Station)," and so on) are configured in a user terminal (UE (User Equipment)).

Meanwhile, in LTE Rel. 12, dual connectivity (DC), in which multiple cell groups (CGs) formed with different radio base stations are configured in UE, is also introduced. Each cell group is comprised of at least 1 cell (CC). Given that multiple CCs of varying radio base stations are integrated in DC, DC is also referred to as "inter-eNB CA."

Also, in LTE Rel. 8 to 12, frequency division duplexing (FDD), in which downlink (DL) transmission and uplink (UL) transmission take place in different frequency bands, and time division duplexing (TDD), in which downlink transmission and uplink transmission switch over time and take place in the same frequency band, are introduced.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Future radio communication systems (for example, 5G, NR, etc.) are expected to realize various radio communication services so as to fulfill mutually varying requirements (for example, ultra high speed, large capacity, ultra-low latency, etc.).

For example, 5G/NR is under study to provide radio communication services, referred to as "eMBB (enhanced Mobile Broad Band)," "mMTC (massive Machine Type Communication)," "URLLC (Ultra Reliable and Low Latency Communications)," and so on.

Also, 5G/NR is expected to support different frequencies and different bandwidths. Given these frequencies, the problem then lies in how to efficiently operate user terminals with various capabilities.

The present invention has been made in view of the above, and it is there an object of the present invention to provide a user terminal and a radio communication method, whereby frequency bands can be used efficiently depending on what capabilities a user terminal has.

Solution to Problem

According to one aspect of the present invention, a user terminal includes a receiving section that receives a plurality of synchronization signal blocks, transmitted in each of a plurality of frequency bands in a specific frequency band, and a control section that controls transmission and/or receipt to use the specific frequency band, based on at least one of the plurality of synchronization signal blocks.

Advantageous Effects of Invention

According to the present invention, frequency bands can be used efficiently depending on what capabilities a user terminal has.

BRIEF DESCRIPTION OF DRAWINGS

FIG. 1 is a diagram to show examples of RF processing by UEs;

FIGS. 2A and 2B are diagrams to show examples of frequency bands for use for UEs having different UE capabilities;

DESCRIPTION OF EMBODIMENTS

Envisaging NR, studies are in progress to support bandwidth up to 400 MHz in frequency bands higher than 6 GHz and support bandwidth up to 100 MHz in frequency bands lower than 6 GHz, for the purpose of expanding bandwidth.

Even if the NW (for example, a base station, a gNB, etc.) supports such bandwidths, UE may have a limited bandwidth in CC depending on its RF (Radio Frequency) and/or baseband-related capabilities.

FIG. 1 is a diagram to show examples of RF chains. A frequency band that can be used for a channel in NR is referred to as a "channel band." The NW processes a channel band using 1 RF chain (for example, transmitting/receiving sections, an RF processing section, etc.). UE #1 can process a channel band using 1 RF chain. UE #2 can process a channel band using 2 RF chains. Each 2 RF chain can process half the bandwidth of the channel band. The baseband signal processing section of UE #2 may process each RF chain's band as a CC and process 2 CCs, or the baseband signal processing section of UE #2 may process the bands of the 2 RF chains together as 1 CC.

The RF chain-related capabilities of each UE may be represented by UE capabilities.

FIG. 2 are diagrams to show examples of frequency bands for use for UEs having different UE capabilities. A UE that can process a channel band by using 1 RF chain is referred to as a "wideband UE," and a UE that can process a channel band by using 1 RF chain due to RF-related capability limitations and the like is referred to as a "narrowband UE."

As shown in FIG. 2A, wideband UE #1 runs CA to use a CC having a 200-MHz bandwidth and a CC having a 200-MHz bandwidth in a channel band having a 400-MHz bandwidth. In this case, a guard band may be provided between the 2 CCs. The narrowband UE processes 1 CC having a bandwidth narrower than 200 MHz.

As shown in FIG. 2B, wideband UE #2 processes a channel band as 1 CC.

The NW may operate using a wideband CC for some UEs, and, at the same time, for other UEs, the NW may run CA by using a set of multiple contiguous CCs (intra-band contiguous CCs) in the band of the wideband CC. Each CC in the set of multiple CCs may be referred to as a "narrowband CC." A wideband CC may be a CC to span a channel band, or may be a CC to span a wider band than a narrowband CC.

Figure 3:
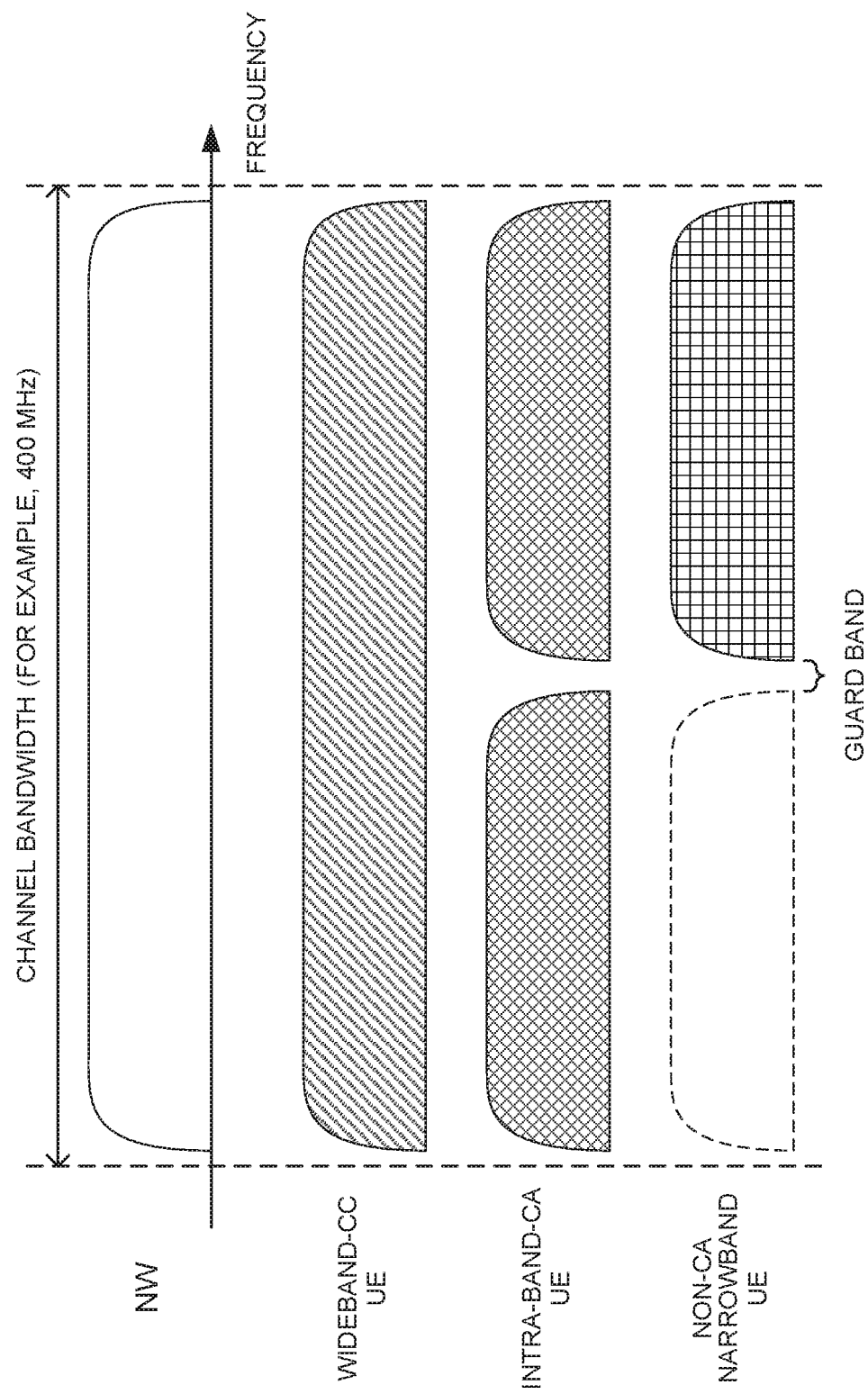
FIG. 3 is a diagram to show examples of UE capabilities.

FIG. 3 is a diagram to show examples of UE capabilities. The channel band is, for example, 400 MHz. The NW can process the whole channel band. A band that can be processed by the NW is referred to as a "NW channel band."

In this example, UEs #1, #2 and #3, having different UE capabilities, co-exist.

UE #1 is a wideband-CC UE that can use a NW channel band as 1 CC. UE #2 is an intra-band CA UE that can run CA using 2 bands obtained by dividing an NW channel band. UE #3 is a non-CA narrowband UE that uses only one of the 2 bands and does not run CA.

A wideband-CC UE may be referred to as a "wideband UE," which has been mentioned earlier, and an intra-band CA UE and a non-CA narrowband UE may be each referred to as a "narrowband UE," which has also been mentioned earlier. A NW channel band may be referred to as a "wideband CC." The 2 bands may be each referred to as a "narrowband CC."

The intra-band CA UE may perform baseband signal processing on the assumption that 2 RF chains constitute 1 wideband CC, or perform baseband signal processing for each of the 2 RF chains. Also, the intra-band CA UE may use 3 or more narrowband CCs. For example, the intra-band CA UE may process a 400-MHz channel band by using 4 RF chains that can each process a 100-MHz band.

In this drawing, a guard band is provided between 2 CCs used by the intra-band CA UE, but the guard band does not have to be provided.

When UEs having different UE capabilities co-exist like this, the following problems might arise:

(1) Whether guard bands are necessary or not is not decided.

(2) The operation for 1 SS (Synchronization Signal) block in a wideband CC is not decided.

(3) The operation for a number of SS blocks in a wideband CC is not decided. For example, when and where SS blocks are transmitted, whether 1 SS block is transmitted in a NW channel band, and whether a number of SS blocks are transmitted in a NW channel band are not decided.

An SS block refers to resources (or a resource set) including at least one of an NR-PSS (Primary Synchronization Signal), an NR-SSS (Secondary Synchronization Signal), and a PBCH (Physical Broadcast CHannel). For example, a UE may assume that an NR-PSS, an NR-SSS and a PBCH, when received in an SS block corresponding to the same SS block index (time index corresponding to the SS block), have been transmitted in the same transmitting beam. The UE can detect the SS block index from a signal in the SS block.

(4) When/how to learn UE capability information is not decided. For example, since the NW needs to perform a DFT (Discrete Fourier Transform)-S (spread)-OFDM or allocate resources by avoiding guard bands, the NW needs to know whether a UE uses 400-MHz bandwidth as multiple CCs or uses 1 400-MHz bandwidth as 1 CC. An existing NW acquires UE capability information after RRC (Radio Resource Control)-connected mode is established, and therefore, cannot use a wideband during initial access procedures (RACH (Random Access CHannel) procedures, random access procedures, etc.).

(5) How to provide PRB indices that represent resources is not decided. For example, when UEs having different UE capabilities co-exist and different frequency resources are allocated, the problem is what indices should be used to report frequency resources.

(6) The configuration of reference signals (RSs) is not decided. For example, whether to use a wide-band (long) sequence or to use narrow-band (short) sequences by bundling them for an RS is a question.

So, the present inventors have come up with the idea of allowing a wideband-CC UE to receive multiple SS blocks that are transmitted in each of a number of frequency bands in a NW channel band. By this means, even when a wideband-CC UE and an intra-band CA UE co-exist, it is possible to use a wideband efficiently depending on what capabilities user terminals have.

Now, embodiments of the present invention will be described in detail below with reference to the accompanying drawings. Note that the radio communication methods according to the herein-contained embodiments may be used individually or may be used in combination.

Radio Communication Method

First Embodiment

According to a first embodiment of the present invention, a number of SS blocks are transmitted (multi-SS block operation) at different frequency locations (frequency resources) within a NW channel band.

A wideband-CC UE may receive a number of SS blocks, transmitted respectively in a plurality of narrowband CCs in a wideband CC, and perform transmission and/or receipt using the wideband CC, based on at least one of the plurality of SS blocks.

For example, by performing measurements using a number of SS blocks, the accuracy of measurements can be improved when a number of narrowband CCs all have varying channel characteristics.

Now, a number of examples of multi-SS block operations to use multiple SS blocks in a wideband CC will be described below.

<<First Multi-SS Block Operation>>

Here, a UE to use multiple narrowband CCs detects multiple SS blocks. This enables the UE to perform initial access procedures at multiple frequency locations.

Figure 4:
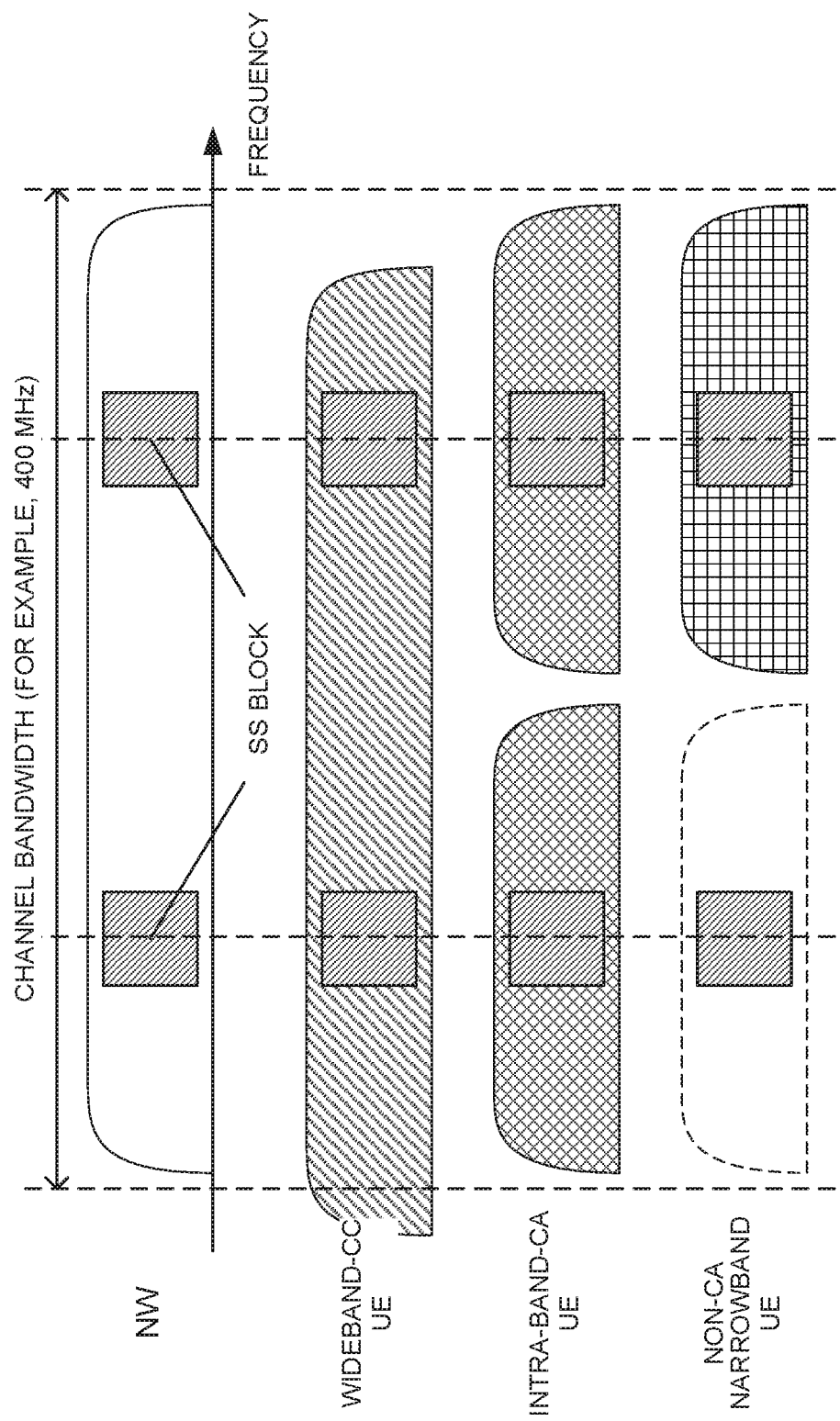
FIG. 4 is a diagram to show an example of first multi-SS block operation.

FIG. 4 is a diagram to show an example of first multi-SS block operation. In this drawing, the NW channel band is 400 MHz. A wideband-CC UE can use a channel band as 1 wideband CC. An intra-band CA UE and a non-CA narrowband UE use a narrowband CC having a bandwidth half the channel bandwidth. In this drawing, the bandwidth of a narrowband CC is 200 MHz. The intra-band CA UE runs CA using 2 narrowband CCs in the NW channel band. The non-CA narrowband UE uses one of the 2 narrowband CCs in the NW channel band. There may be 3 or more narrowband CCs in the NW channel band.

The NW transmits SS blocks in each of the multiple narrowband CCs. The number of synchronization signals in the wideband CC and their frequency locations are selected by the NW. Here, assume that 2 narrowband CCs are used by the same base station. The UEs may run inter-base station CA (DC) using contiguous CCs belonging to multiple different base stations.

The wideband-CC UE and the intra-band CA UE detect a number of SS blocks. The non-CA narrowband UE detects 1 SS block. After detecting SS blocks, the UEs perform initial access procedures.

In initial access procedures, the UEs may use any of the narrowband CCs.

The wideband-CC UE may perform RRM measurements with respect to multiple narrowband CCs (multiple SS blocks) during initial access procedures. By this means, even when every narrowband CC shows varying channel characteristics, accurate channel estimation can be performed over a wideband from an early stage. Also, the intra-band CA UE performing RRM measurements with respect to multiple narrowband CCs (multiple SS blocks) during initial access procedures, so that the intra-band CA UE can run CA immediately after entering RRC-connected mode.

The UEs may perform RRM measurements using an anchor SS block specified by the NW among multiple SS blocks. Also, different types of RRM measurements may be applied to the anchor SS block and non-anchor SS blocks.

In addition, when the NW designates an anchor SS block to the UE, part of the processes including transmission of system information (for example, RMSI (Remaining Minimum System Information)), monitoring of the common search space, RACH procedures, paging and radio link monitoring (RLM) may be performed using the CC including the anchor SS block, and some of the rest of the processes may be performed using CCs including non-anchor SS blocks. That is, the anchor SS block and non-anchor SS blocks may have different roles. The RMSI is the minimum system information that is necessary for communication, such as SIBs (System Information Blocks).

The system information may indicate the presence of other SS blocks, or represent parameters related to these SS blocks. After having read 1 SS block, the wideband-CC UE and/or the intra-band CA UE may read system information based on the contents of this SS block. Also, each UE may perform rate matching and/or puncturing based on detected SS blocks and/or SS blocks indicated in the system information.

<<Second Multi-SS Block Operation>>

Here, a UE to use multiple narrowband CCs detects at least one of multiple SS blocks, and has additional SS blocks configured.

Figure 5:
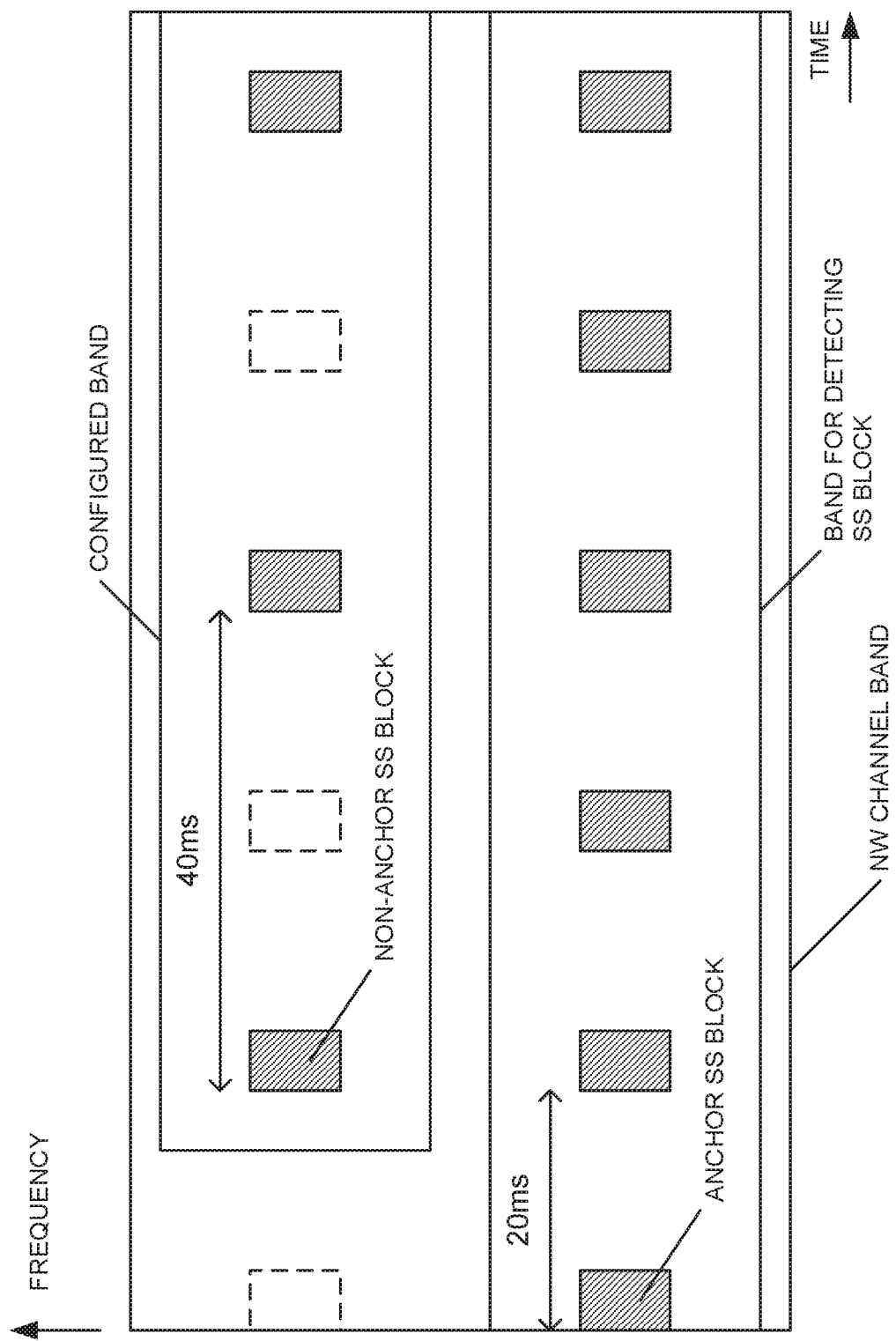
FIG. 5 is a diagram to show an example of second multi-SS block operation.

FIG. 5 is a diagram to show an example of second multi-SS block operation. An anchor SS block is transmitted within a specific narrowband CC in the NW channel band, and non-anchor SS blocks are transmitted in other narrowbands in the NW channel band.

The wideband-CC UE, the intra-band CA UE, and the non-CA narrowband UE all monitor 1 anchor SS block. After an anchor SS block is detected, non-anchor SS blocks are configured for the wideband-CC UE and the intra-band CA UE based on system information.

Parameters that are different from those of the anchor SS block may be configured for non-anchor SS blocks. The parameter may be, for example, the cycle of SS blocks, the contents of SS block, and so on. The cycle of anchor SS blocks does not have to be the cycle of transmitting anchor SS blocks, and may be, for example, the cycle of monitoring anchor SS blocks. In this drawing, the cycle of transmitting anchor SS blocks and non-anchor SS blocks, and the cycle of monitoring anchor SS blocks is configured to be 20 ms, and the cycle of monitoring non-anchor SS blocks is configured to be 40 ms.

Non-anchor SS blocks may be used during initial access procedures. In this case, non-anchor SS blocks may be configured by means of system information. Also, even during initial access procedures, RRM measurements for multiple different CCs are made possible. For example, a UE reads an SS block and reads the system information, and non-anchor SS blocks, RRM measurement parameters, including an indication of RRM measurements are conducted or not, and RACH resources are configured. Following this, the UE performs initial access procedures and RRM measurements. Message 3 may be used to send a report of measurement results, and the report may include measurement results of multiple narrowband CCs.

According to the second configuration described above, it is possible to configure additional SS blocks in a flexible manner.

According to the first embodiment described above, SS blocks are transmitted in each narrowband CC in a wideband CC, so that it is possible to off-load the traffic over multiple narrowband CCs even during initial access procedures and prevent the concentration of traffic in specific narrowband CCs.

Also, even when wideband UEs and narrowband UEs co-exist, a wideband can be used efficiently.

Second Embodiment

According to a second embodiment of the present invention, 1 SS block is transmitted (single-SS block operation) at 1 frequency location in a NW channel band.

Following SS block-based random access procedures, an intra-band CA UE may perform transmission and/or receipt in multiple narrowband CCs, based on multiple specific signals (for example, synchronization/tracking signals or SS blocks) that are transmitted respectively in multiple narrowband CCs in the band of a wideband CC.

In most cases, using 1 SS block is sufficient for the intra-band CA UE. Also, using 1 SS block is effective when there are no significant differences in channel characteristics among multiple narrowband CCs. Since the UE only needs to detect 1 SS block, the load of detection can be reduced.

Now, a number of examples of single-SS block operations to use 1 SS block in a wideband CC will be described below.

<<First Single-SS Block Operation>>

Here, the frequency locations and synchronization/tracking signals are configured after the intra-band CA UE detects an SS block (during or after initial access procedures).

Figure 6:
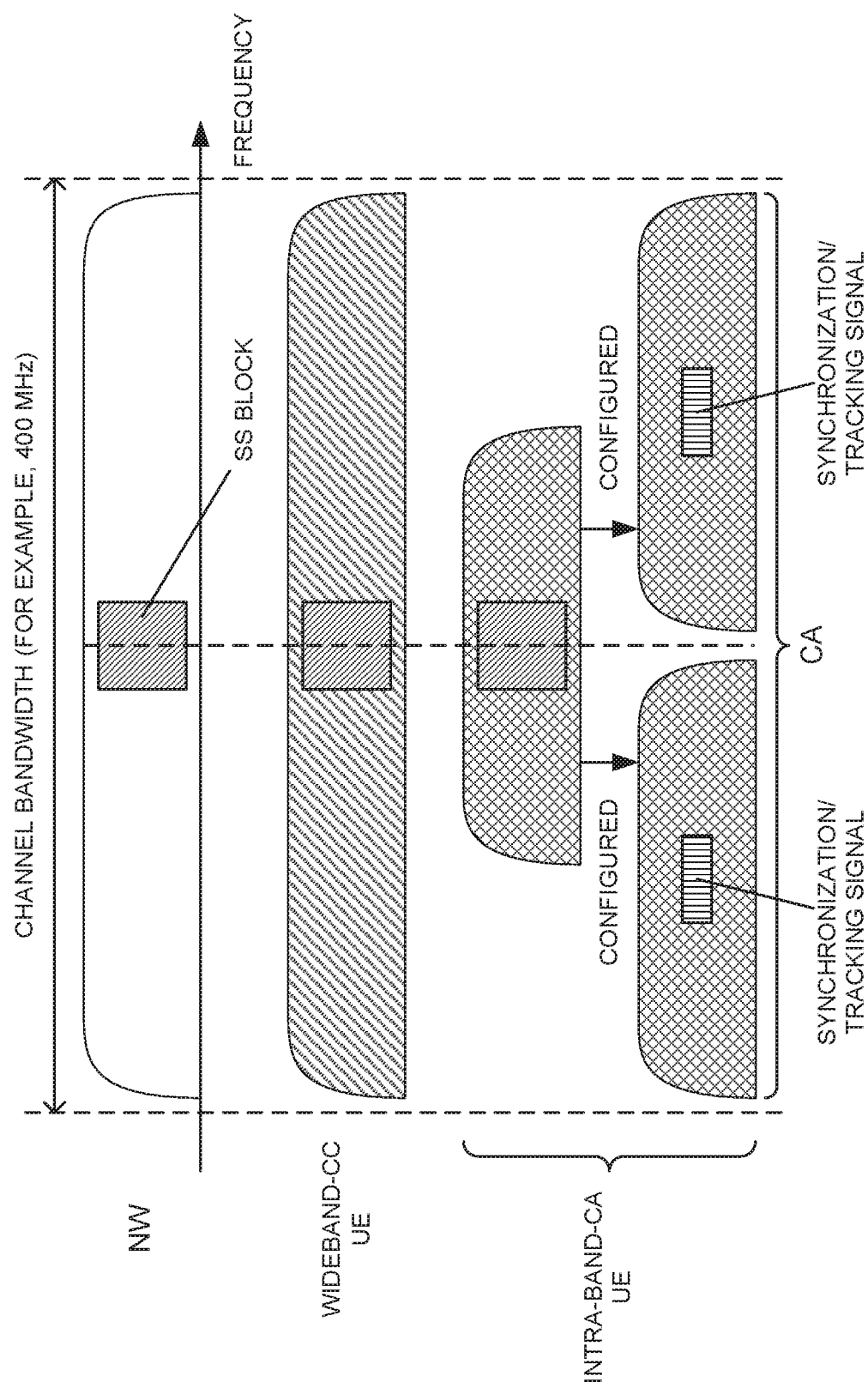
FIG. 6 is a diagram to show an example of first single-SS block operation.

FIG. 6 is a diagram to show an example of first single-SS block operation. 1 common SS block is transmitted in a wideband CC and narrowband CCs that overlap each other. Each UE may detect 1 SS block as in existing methods. To prevent concentration of traffic in narrowband CCs, after the intra-band CA UE detects the SS block, a number of narrowband CCs are allocated to that UE, and the intra-band CA UE runs CA by using multiple narrowband CCs. This makes it possible to off-load the traffic over multiple narrowband CCs.

After a non-CA narrowband UE detects the SS block in a given narrowband CC, narrowband CCs of different frequencies may be allocated to the UE.

When UEs use narrowband CCs of varying frequencies, the problems have to do with synchronization. Then, synchronization and/or tracking signals for synchronization and/or tracking are configured in each narrowband CC that is allocated to the intra-band CA UE or the non-CA narrowband UE. For example, the synchronization/tracking signal may be one of the PSS, the SSS, the CSI (Channel State Information)-RS for L1/L3, the DM (Demodulation)-RS, the PT (Phase Noise)-RS, and the tracking RS. The PT-RS is used to correct phase noise. The tracking RS is used to maintain synchronization, and may be one of the DM-RS, the CSI-RS and the PT-RS, or may be yet another RS.

The synchronization/tracking signals used by the intra-band CA UE may be shared with the wideband-CC UE.

The transmission of the synchronization/tracking signals may be configured to be periodic, aperiodic or semi-persistent. Aperiodic synchronization/tracking signal transmission may be configured by DCI (Downlink Control Information). When synchronization/tracking signals are transmitted aperiodically, 1 DCI may trigger synchronization/tracking signals for multiple narrowband CCs (cross-carrier scheduling). Semi-persistent synchronization/tracking signal transmission may be configured by the MAC CE (Medium Access Control Control Element) and/or DCI. When synchronization/tracking signals are transmitted semi-persistently, synchronization/tracking signals are transmitted periodically during the period from activation by the NW to deactivation.

Synchronization/tracking signals may be used for RRM measurements. The SS block may be used for RRM measurements even when synchronization/tracking signals are configured. If the frequency location of the SS block is at the boundary of 2 neighbor narrowband CCs allocated to the intra-band CA UE, and the intra-band CA UE measures that SS block, an MG (Measurement Gap) is required for retuning. Alternatively, an MG may be configured if a narrowband CC allocated to the intra-band CA UE includes no SS block or includes only a part of the SS block.

The frequency location of the SS block does not have to be at the center of a wideband CC, and does not have to be at the center of a narrowband CC. For measurements between cells (between sites), the frequency location of the SS block is preferably aligned with the frequency location of the SS block in other cells. If RRM measurements using synchronization/tracking signals are not possible, an RS for measurement may be transmitted at a frequency location apart from the synchronization/tracking signals. Also, an MG may be configured at the timing of the SS block, and the intra-band CA UE may detect the SS block in the MG.

<<Second Single-SS Block Operation>>

Here, instead of synchronization/tracking signals, an SS block is configured.

Figure 7:
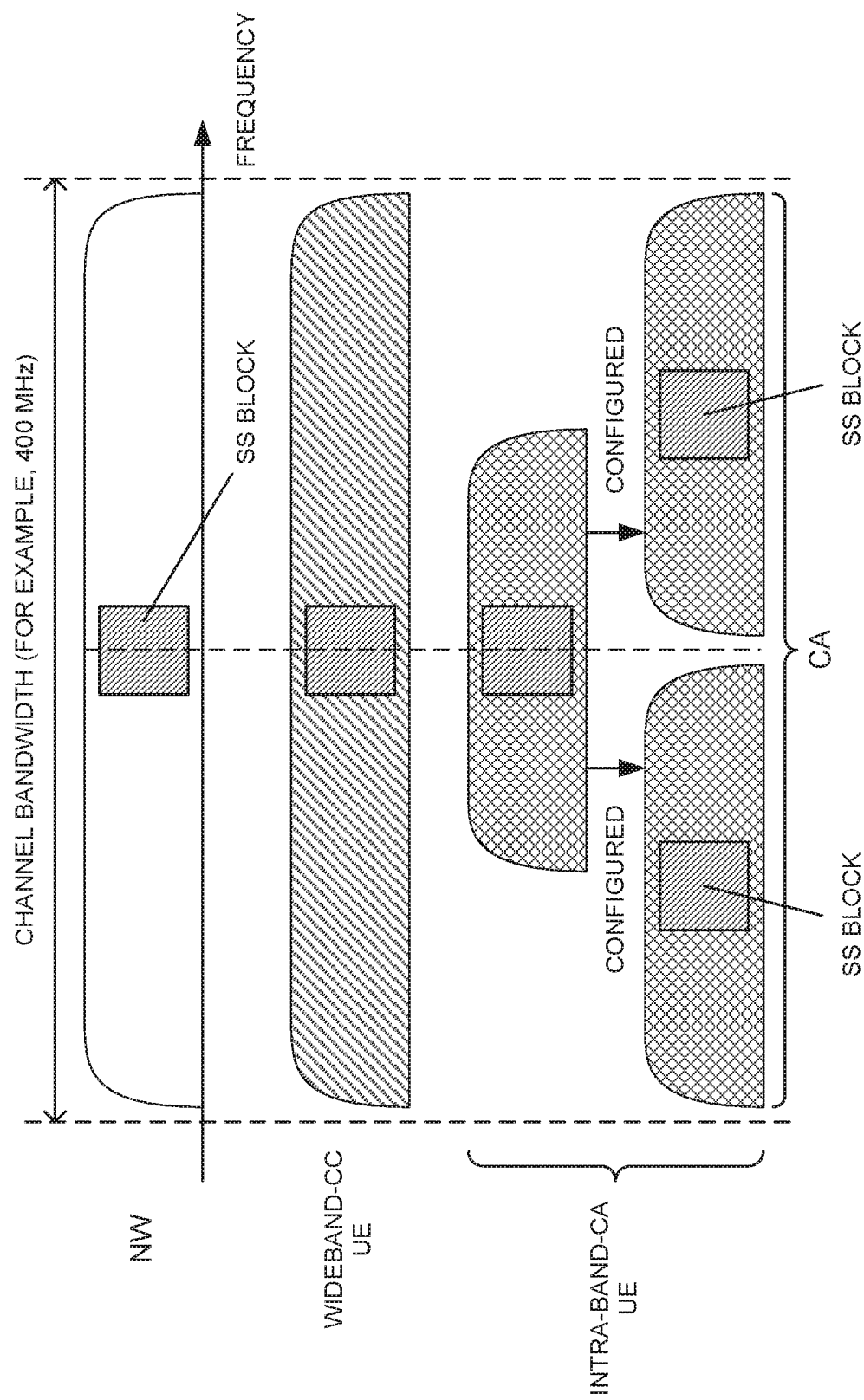
FIG. 7 is a diagram to show an example of second single-SS block operation.

FIG. 7 is a diagram to show an example of second single-SS block operation. Similar to the first single-SS block operation, each UE detects 1 SS block. Similar to the first single-SS block operation, after the intra-band CA UE detects the SS block, a number of narrowband CCs are allocated to that UE, and the intra-band CA UE runs CA by using multiple narrowband CCs.

An SS block is configured in each narrowband CC that is allocated to the intra-band CA UE or the non-CA narrowband UE. The transmission of the SS block may be configured to be periodic, aperiodic or semi-persistent.

This allows each UE to read the PBCH in the SS block.

<<Third Single-SS Block Operation>>

Here, an SS block is transmitted in a specific narrowband CC that overlaps a wideband CC.

Figure 8:
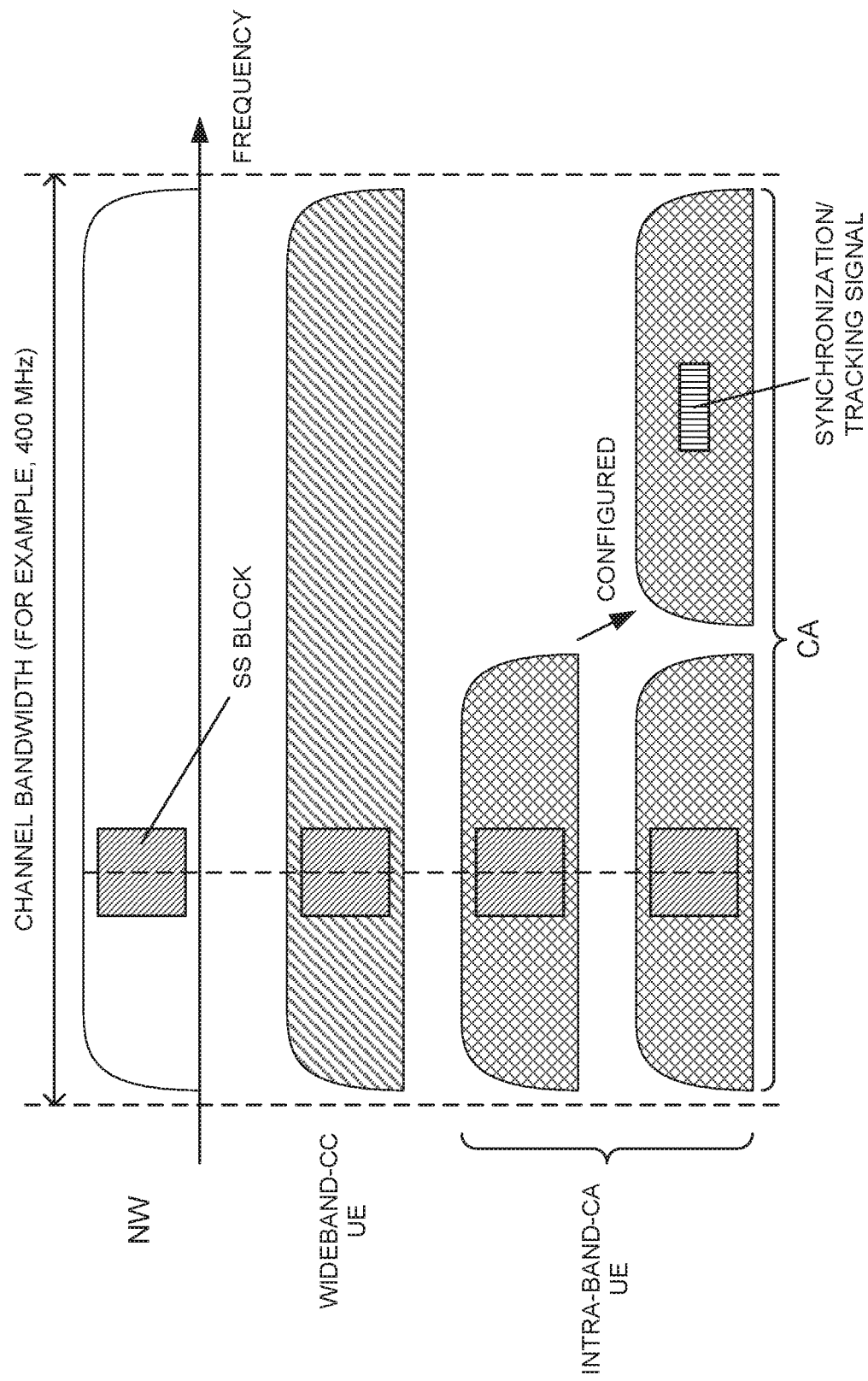
FIG. 8 is a diagram to show an example of third single-SS block operation.

FIG. 8 is a diagram to show an example of third single-SS block operation. The frequency location of the SS block is always aligned between the intra-band CA UE and the wideband-CC UE. In this drawing, the SS block is transmitted at the center frequency in 1 narrowband CC of 2 narrowband CCs.

After the intra-band CA UE detects an SS block in a given narrowband CC, another narrowband CC is configured, and synchronization/tracking signals or an SS block is configured in the configured narrowband CC. The transmission of the synchronization/tracking signals or the SS block may be configured to be periodic, aperiodic or semi-persistent.

In the first single-SS block operation and the second single-SS block operation, the intra-band CA UE needs retuning and MGs when measuring SS blocks outside the narrowband CC. According to the third single-SS block operation, retuning and MGs are not necessary because the frequency location of the SS block does not change before and after initial access procedures. Consequently, the procedures of the third single-SS block operation are simplified compared to the first single-SS block operation and the second single-SS block operation.

When a wideband CC overlaps with an odd number of narrowband CCs and the intra-band CA UE runs CA using an odd number of narrowband CCs, the SS block is transmitted at the center frequency of the center narrowband CC, so that the frequency location of the SS block can be aligned with the center frequency of the wideband CC. By measuring the SS block at the center frequency of a wideband CC, it is possible to improve the accuracy of measurements of channel characteristics.

When a wideband CC overlaps with an even number of narrowband CCs and the intra-band CA UE runs CA using an even number of narrowband CCs, the frequency location of the SS block is not at the center frequency of the wideband CC, and is likely to be inclined to either side.

Third Embodiment

Now, with a third embodiment of the present invention, the method of generating an RS for use for wideband-CC UEs and intra-band CA UEs will be described below. The present embodiment may be combined with the first embodiment and/or the second embodiment.

The reference signal here may be any of the DM-RS, the tracking RS, the CSI-RS, the PT-RS and the SRS. The following 2 approaches may be possible to generate the reference signal. Here, the RS may be an RS for DL or an RS for UL.

Figure 9:
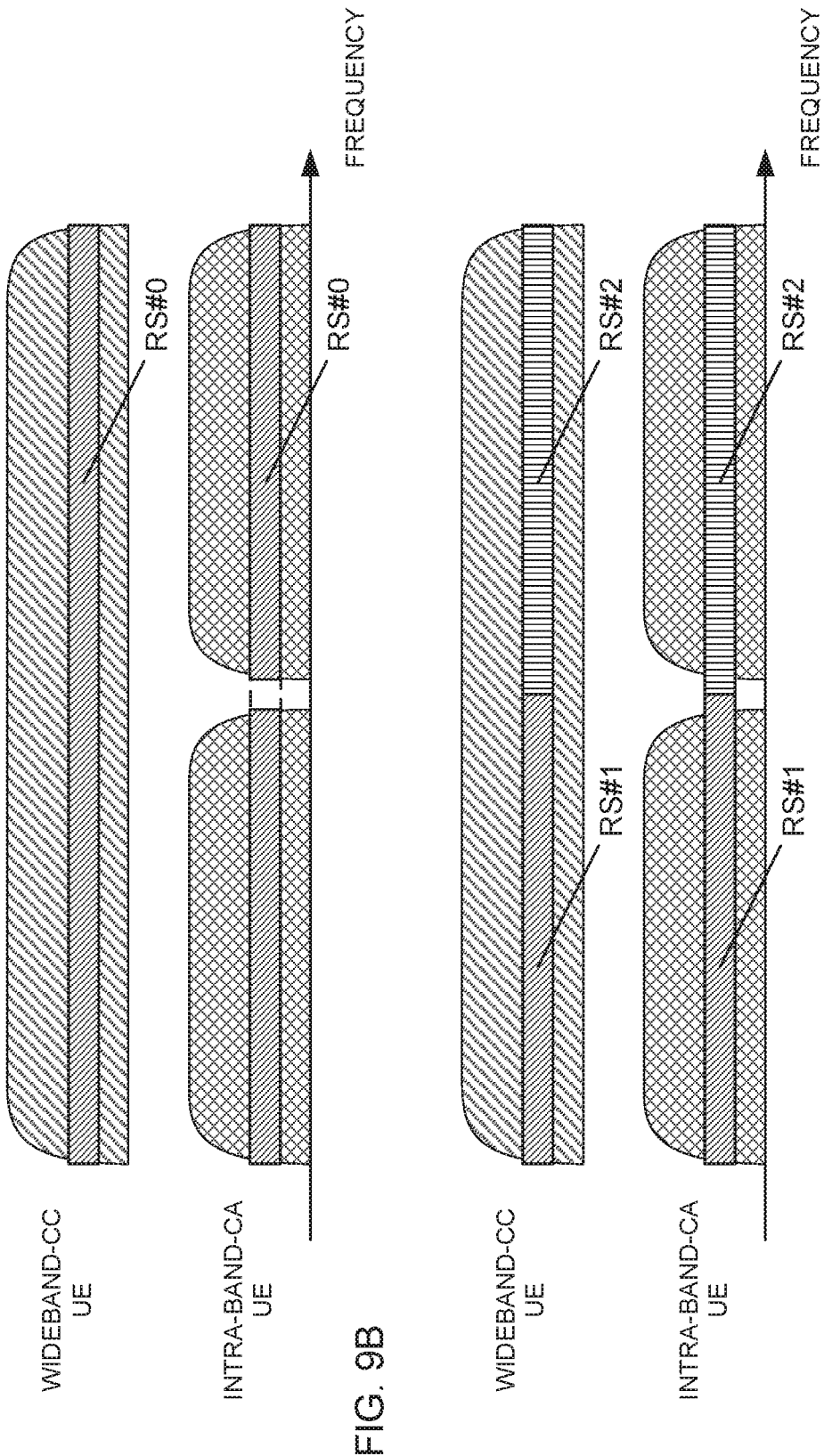
FIGS. 9A and 9B are diagrams to show examples of methods for generating RSs.

FIG. 9A is a diagram to show approach 1 to generate RSs.

Approach 1: Common RS #0 is used for a wideband-CC UE and an intra-band CA UE. In this case, the UEs need to know the NW channel bandwidth (the bandwidth of a wideband CC).

Because the RS sequence that is generated extends over a wideband CC, when a guard band is provided, the part of the RS sequence on the guard band is punctured. If no guard band is provided, the RS extends over multiple CCs.

FIG. 9B is a diagram to show approach 2 to generate RSs.

Approach 2: RS #1 and RS #2 are generated on a per block basis. The NW channel band is comprised of multiple blocks. The size of a block may be the minimum channel bandwidth, the UE channel bandwidth (for example, the bandwidth of a narrowband CC), and so forth. The size of a block in this drawing matches the bandwidth of a narrowband CC. The RS for a wideband-CC UE is generated by connecting a number of blocks of RSs. If a guard band is provided, the RS sequence is generated taking the guard band into account.

When the number of narrowband CCs included in a wideband CC increases, RSs for an increased number of narrowband CCs can be generated. Also, MU-MIMO for the wideband-CC UE and the intra-band CA UE becomes simple. Also, the UE to use narrowband CCs does not need to know the NW channel bandwidth.

In both approach 1 and approach 2, when guard bands are provided, the RS sequence is punctured.

According to approach 1 or approach 2, the wideband-CC UE and the intra-band CA UE use the same RS, so that cell operation and planning become simple.

Also, the wideband-CC UE may use the RS of approach 1, and the intra-band CA UE may use the RS of approach 2.

Fourth Embodiment

With a fourth embodiment of the present invention, initial access procedures will be described. The present embodiment may be combined with the first embodiment and/or the second embodiment.

<<Initial Access Procedures>>

It is preferable, in order to reduce the overhead of reporting system information, to use a common RMSI for an intra-band CA UE and a wideband-CC UE.

The NW has no way of knowing whether a UE before initial access procedures has the capability to use a band that is wider than the minimum channel band, and therefore the RMSI is preferably transmitted in the SS block band or in the smallest channel band that all UEs can support. This allows all of a wideband-CC UE, an intra-band CA UE and a non-CA narrowband UE to read the RMSI. For example, assuming a carrier frequency lower than 6 GHz, the minimum channel bandwidth is 5 MHz. Also, for example, at a carrier frequency higher than 6 GHz, the minimum channel bandwidth is 50 MHz. For example, the SS block bandwidth is 2.5 MHz.

A wideband can be used for configurations related to the RACH (Random Access CHannel). However, a wideband is not used until the NW learns what bandwidth-related capabilities a UE has. Therefore, it is necessary to configure the RACH using bands equal to or less than the minimum channel bandwidth.

Figure 10:
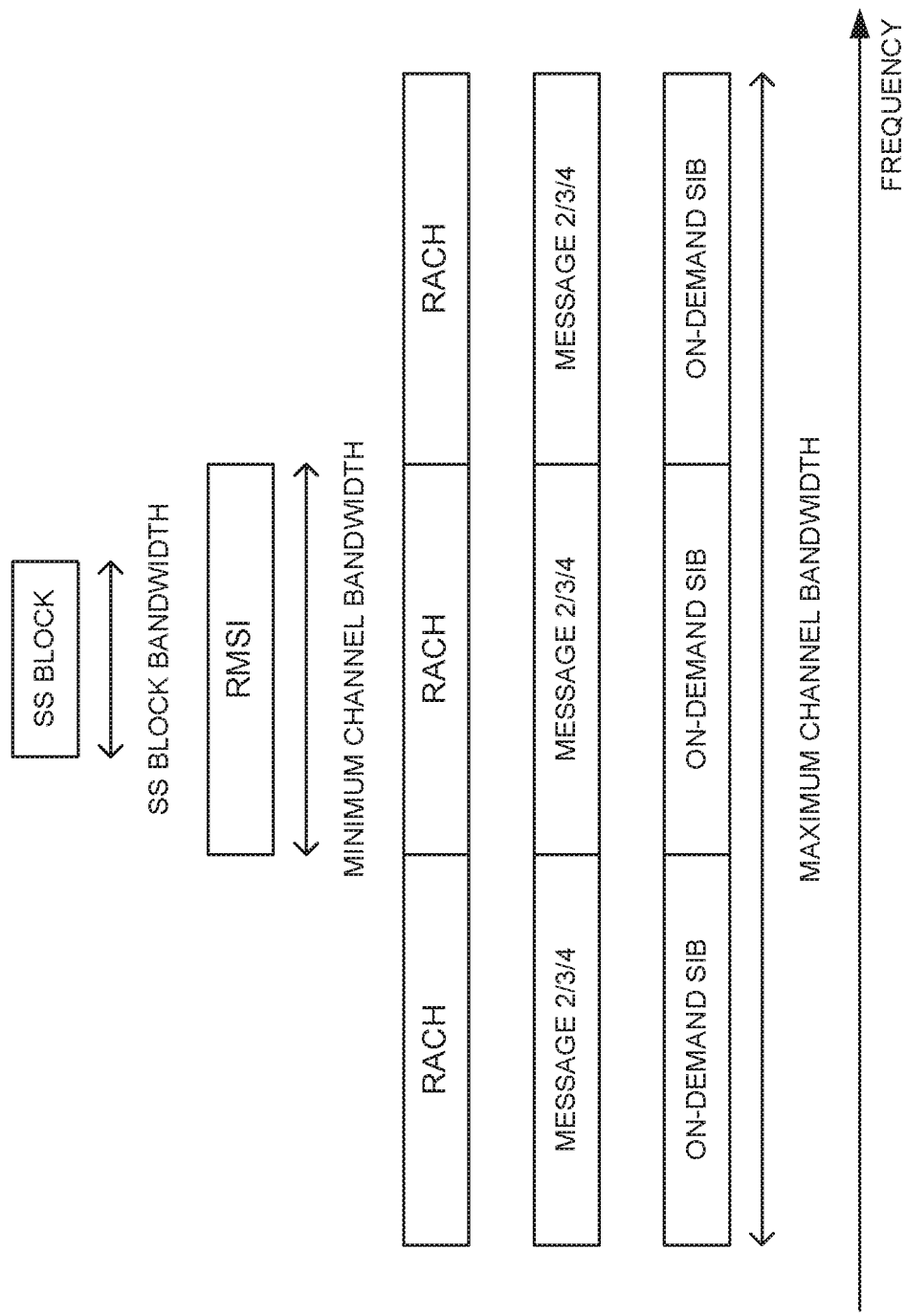
FIG. 10 is a diagram to show an example of initial random access procedures.

FIG. 10 is a diagram to show an example of initial random access procedures. A UE detects an SS block of an SS block bandwidth. The SS block contains the configuration of the RMSI. The UE receives an RMSI of the minimum channel bandwidth based on the contents of the SS block. The UE transmits a RACH (also referred to as a "PRACH (Physical Random Access CHannel)," "random access preamble," "message 1," etc.), thereby performing initial access procedures. A wideband (for example, the NW channel band) can be used during initial access procedures or after initial access procedures. The NW channel bandwidth may be referred to as the "maximum channel bandwidth."

The information for which a wideband may be used can be any of the RACH, messages 2, 3 and 4, and on-demand SIBs. An on-demand SIB is a SIB that is transmitted upon request from the UE.

Several options such as listed below may be possible for using a wideband:

Option 1: When the UE uses RACH resources outside the minimum channel band, the UE is regarded as being a wideband-CC UE. In this case, a wideband can be applied to message 2 (also referred to as a "RAR (Random Access Response)"). By this means, the NW can transmit a large amount of information quickly using message 2. If RACH resources outside the minimum channel band are not used, resources outside the minimum channel band cannot be used, and the minimum channel bandwidth is used for messages 2 to 4.

Note that the case in which the UE uses RACH resources outside the minimum channel band is by no means limiting, and the UE may be regarded as being a wideband-CC UE when the UE uses a specific RACH resource, or the UE may be regarded as being an intra-band CA UE. The particular RACH resource here may be a RACH sequence.

Option 2: A wideband-CC UE and an intra-band CA UE are associated with different RACH resources. After the base station receives a RACH, a wideband is used.

Option 3: Message 3 may show UE capabilities. UE capabilities may include, for example, the UE channel bandwidth, and include the number of CCs used by that UE. In this case, message 3 and all of the previous DL and UL messages may be limited to the minimum channel bandwidth. If UE capabilities indicate that a band wider than the minimum channel bandwidth is used, the NW transmits message 4 using the wideband.

Option 4: UE capabilities may be reported after RRC connection is established. In this case, the minimum channel bandwidth is used during initial access procedures (RACH, messages 2 to 4, etc.).

According to Options 1 to 3, a wideband-CC UE and an intra-band CA UE can use a band wider than the minimum channel band during initial access procedures.

If such initial access procedures are possible, the bandwidth to be used can be changed flexibly depending on UE capabilities during initial access procedures, so that a wideband can be used efficiently.

<<Frequency Location Information>>

To change the band to be used, it may be necessary to report the frequency location of the information to be transmitted and received. For example, a UE first detects the frequency location of the SS block, but has no information regarding the frequency location of the information to be transmitted and received following that. Therefore, frequency location information to show the frequency location (for example, the PRB, other frequency units, etc.) and the bandwidth (for example, the number of PRBs, the number of other frequency units, etc.) of specific information such as one of system information, the RACH, message 2 and message 3 may be reported. The frequency location information may be reported from the NW to the UE, or may be reported from the UE to the NW.

For the frequency location information, the following concerns need to be taken into consideration:

(1) The SS block may not be located at the center frequency of the channel band.

(2) The channel bandwidth of a UE depends on UE capabilities.

For example, when UEs having different UE capabilities co-exist, the center frequency of a narrowband CC does not necessarily match the center frequency of a wideband CC.

If a frequency band that is allocated to specific information (specific information band) includes the SS block band, the frequency location information may show, among the PRBs included in the specific information band, the number of PRBs located at lower frequencies than the frequency location of the SS block and the number of PRBs located at higher frequencies than the frequency location of the SS block. By this means, the frequency location information can show the band of specific information (the frequency location and the bandwidth) based on the frequency location of the SS block.

The NW channel band may be split into multiple blocks. The frequency location information may show the band of specific information in units of blocks having a given bandwidth. The size of a block may be any of the SS block bandwidth, the minimum channel bandwidth and the bandwidth of an RBG (Resource Block Group).

The frequency location information may use the number of blocks instead of the number of PRBs described above.

Furthermore, the frequency location information may indicate the relative frequency location of specific information with respect to the SS block. The frequency location may represent the resource unit corresponding to the center frequency of the specific information's band, or represent the resource unit corresponding to the lowest frequency and/or the highest frequency of the specific information band. The frequency location information may include information to show the bandwidth of specific information's band (for example, the number of unit resources). The unit resource is, for example, a block and/or a PRB.

The frequency location information may further show the frequency location of specific information using the PRB index in each block.

Figure 11:
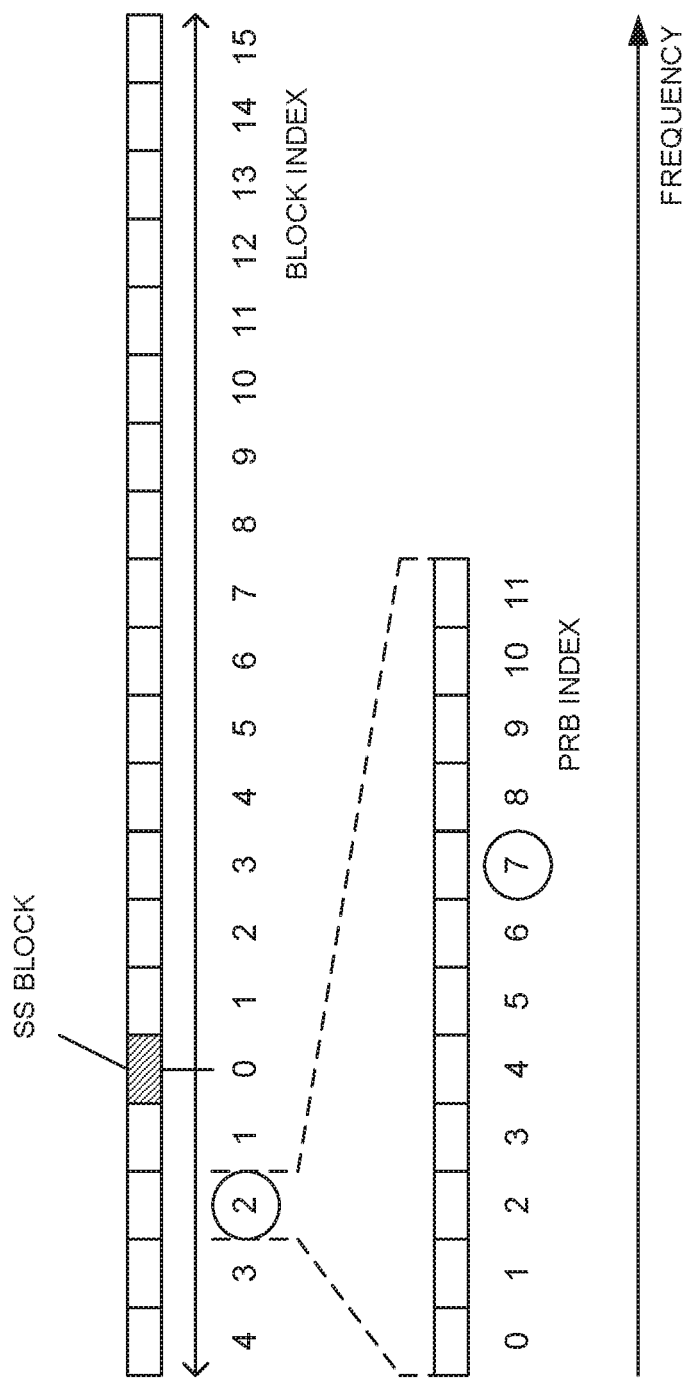
FIG. 11 is a diagram to show examples of frequency location information.

FIG. 11 is a diagram to show an example of frequency location information. The frequency location information in this drawing indicates the frequency location of the RMSI. This frequency location information indicates that the frequency location of the RMSI is in the seventh PRB in the second block in the lower frequency direction (the left direction in the drawing) from the block where the SS block is located.

The frequency location information may define the frequency location of specific information based on the frequency location of 1 SS block detected by the UE among the multiple SS blocks in the first embodiment. Also, the frequency location information may indicate which SS block's frequency location is used as a reference among the multiple SS blocks in the first embodiment.

Note that the frequency location information may indicate the frequency location of specific information to be transmitted or received following that, based on the frequency location of specific information such as one of system information, the RACH, and messages 2 to 4, instead of an SS block. The frequency location information may be included in one of an SS block, system information, the RACH, and messages 2 to 4.

By using such frequency location information, it is possible to show the frequency location of subsequent information based on the frequency location of information that is received earlier. By this means, even when UEs having different UE capabilities co-exist, it is possible to properly report the band to be used.

(Radio Communication System)

Now, the structure of a radio communication system according to one embodiment of the present invention will be described below. In this radio communication system, communication is performed using one of the radio communication methods according to the herein-contained embodiments of the present invention, or a combination of these.

Figure 12:
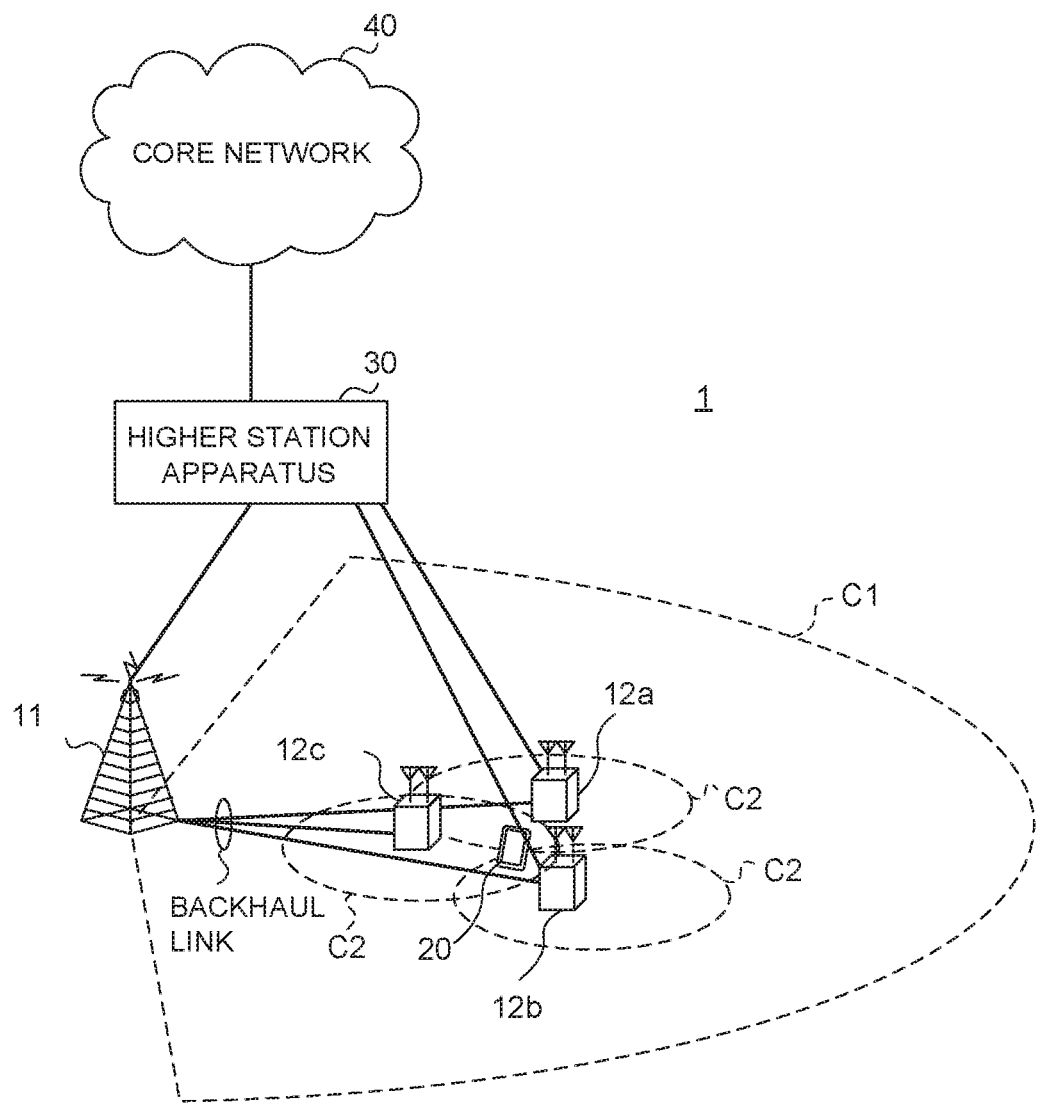
FIG. 12 is a diagram to show an exemplary schematic structure of a radio communication system according to one embodiment of the present invention.

FIG. 12 is a diagram to show an exemplary schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes 1 unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be seen as a system to implement these.

The radio communication system 1 includes a radio base station 11 that forms a macro cell C1, with a relatively wide coverage, and radio base stations 12a to 12c that are placed within the macro cell C1 and that form small cells C2, which are narrower than the macro cell C1. Also, user terminals 20 are placed in the macro cell C1 and in each small cell C2. The arrangement, number and so on of cells and user terminals are not limited to those illustrated in the drawings.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, 5 or fewer CCs or 6 or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a number of terminals to use mutually different bands. Note that, uplink and downlink radio access schemes are not limited to these combinations, and other radio access schemes may be used.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and/or PUSCH scheduling information, is communicated by the PDCCH.

Note that scheduling information may be reported in DCI. For example, DCI to schedule receipt of DL data may be referred to as a "DL assignment," and DCI to schedule UL data transmission may also be referred to as a "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs (Sounding Reference Signals)), demodulation reference signals (DMRSs) and so on are communicated as uplink reference signals. Note that the DMRSs may be referred to as "user terminal-specific reference signals (UE-specific reference signals)." Also, the reference signals to be communicated are by no means limited to these.

(Radio Base Station)

Figure 13:
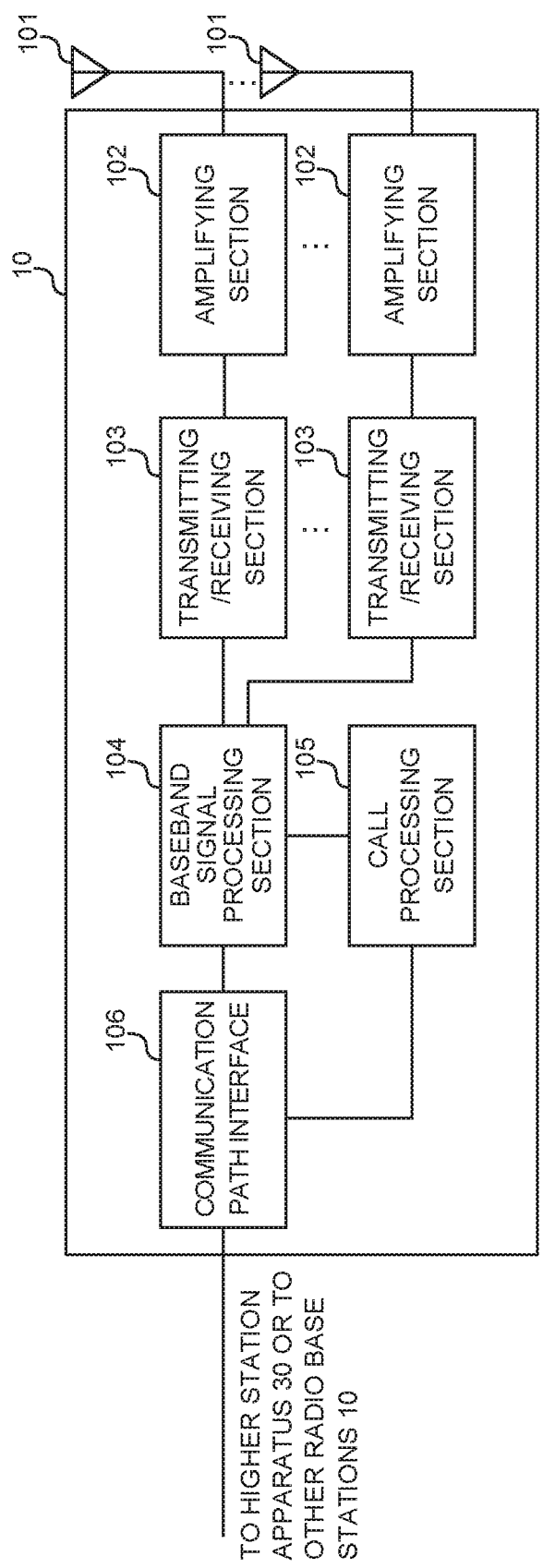
FIG. 13 is a diagram to show an exemplary overall structure of a radio base station according to one embodiment of the present invention.

FIG. 13 is a diagram to show an exemplary overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a given interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Also, the transmitting/receiving sections 103 may respectively transmit, a number of synchronization signal blocks (for example, SS blocks) in a number of frequency bands (for example, multiple narrowband CCs) in a specific frequency band (for example, a wideband CC, a NW channel band, etc.). Also, after 1 synchronization signal block (for example, an anchor SS block) among the synchronization signal blocks is received at the user terminal 20, the transmitting/receiving sections 103 may transmit a parameter to indicate other synchronization signal blocks (for example, non-anchor SS blocks) among the synchronization signal blocks.

Furthermore, the transmitting/receiving sections 103 may transmit a synchronization signal block (for example, an SS block) in part of frequency band (for example, a narrowband) in a specific frequency band (for example, a wideband CC, a NW channel band, etc.). Also, after random access procedures based on the synchronization signal block, the transmitting/receiving sections 103 may transmit a number of specific signals (for example, synchronization/tracking signals, SS blocks, etc.) in a number of frequency bands in a specific frequency band, respectively.

Figure 14:
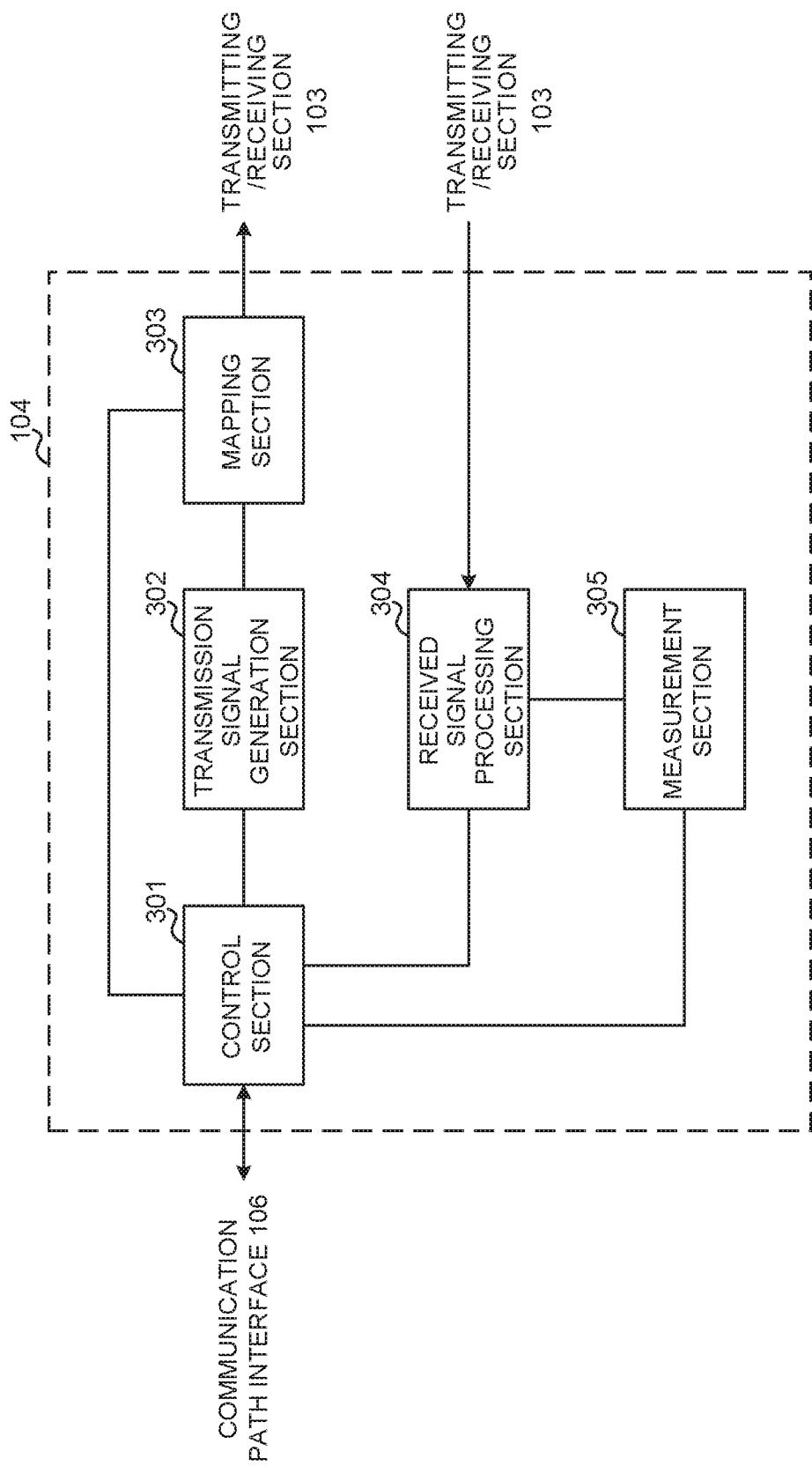
FIG. 14 is a diagram to show an exemplary functional structure of a radio base station according to one embodiment of the present invention.

FIG. 14 is a diagram to show an exemplary functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 at least has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH) and downlink control signals (for example, signals communicated in the PDSCH and/or the EPDCCH). Also, the control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

The control section 301 controls scheduling such as uplink data signal (for example, signal transmitted on PUSCH), uplink control signals (for example, signals transmitted on PUCCH and/or PUSCH, including delivery acknowledgment information of delivery dependency, etc.), random access preamble (for example, a signal transmitted on PRACH) and uplink reference signal.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, based on commands from the control section 301. DL assignments and UL grants are both DCI, in compliance with DCI format. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to given radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), the signal strength (for example, RSSI (Received Signal Strength Indicator)), transmission path information (for example, CSI), and so on. The measurement results may be output to the control section 301.

Also, the control section 301 may control transmission and/or receipt using a specific frequency band during random access procedures. Furthermore, the control section 301 may control the transmission and/or receipt of frequency location information, which indicates the frequency location of specific information with respect to at least one of the frequency locations of multiple synchronization signal blocks.

Furthermore, the control section 301 may control the transmission and/or receipt of a reference signal in multiple frequency bands. Also, the control section 301 may control the transmission/receipt of frequency location information, which indicates the location of specific information with respect to the location of a synchronization signal block.

(User Terminal)

Figure 15:
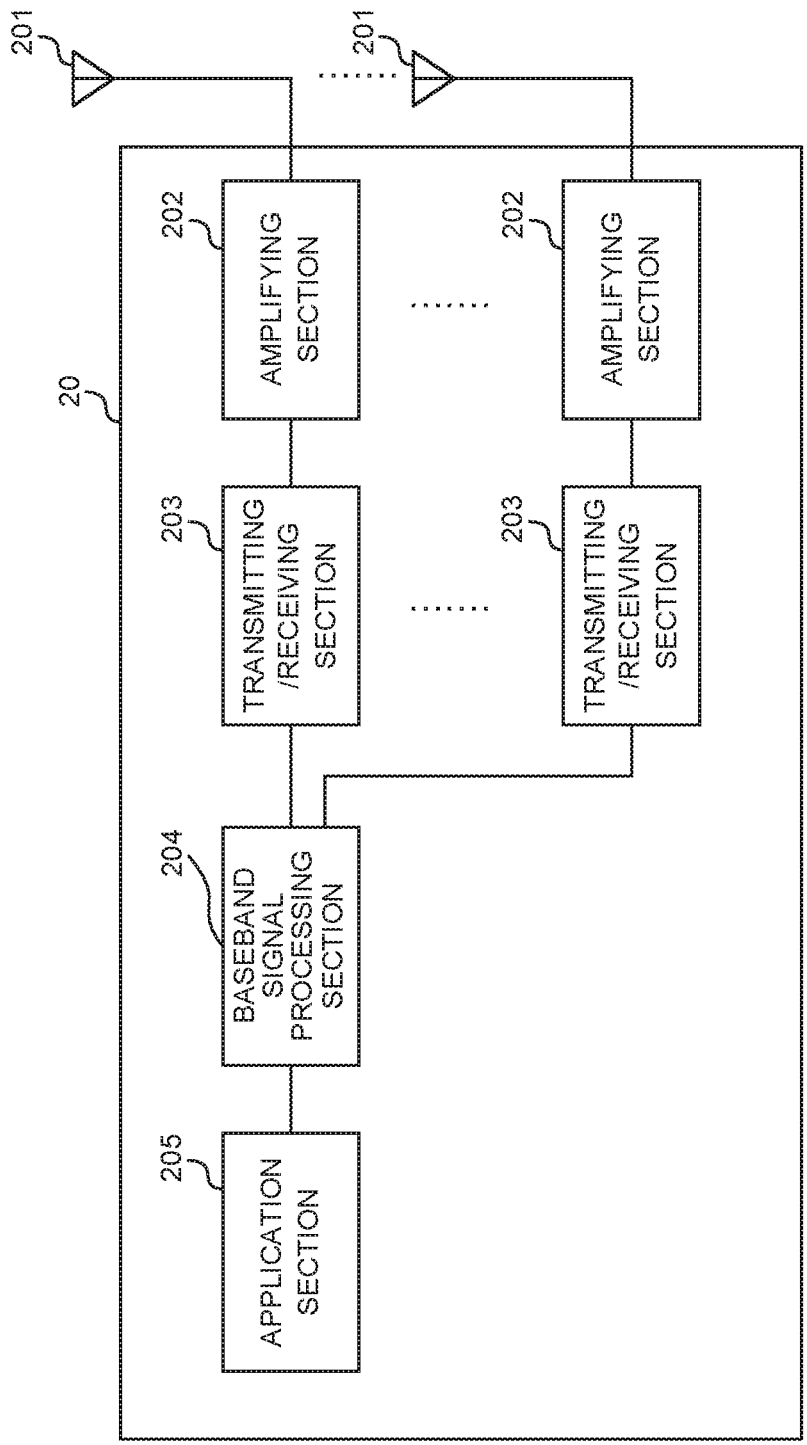
FIG. 15 is a diagram to show an exemplary overall structure of a user terminal according to one embodiment of the present invention.

FIG. 15 is a diagram to show an exemplary overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

Also, the transmitting/receiving sections 203 may receive a number of synchronization signal blocks, which are transmitted, respectively, in a number of frequency bands in a specific frequency band. Also, after 1 synchronization signal block among the synchronization signal blocks is received, the transmitting/receiving sections 203 may transmit a parameter to indicate other synchronization signal blocks among the synchronization signal blocks.

Also, the transmitting/receiving sections 203 may receive synchronization signal blocks transmitted in some frequency bands in a specific frequency band.

Figure 16:
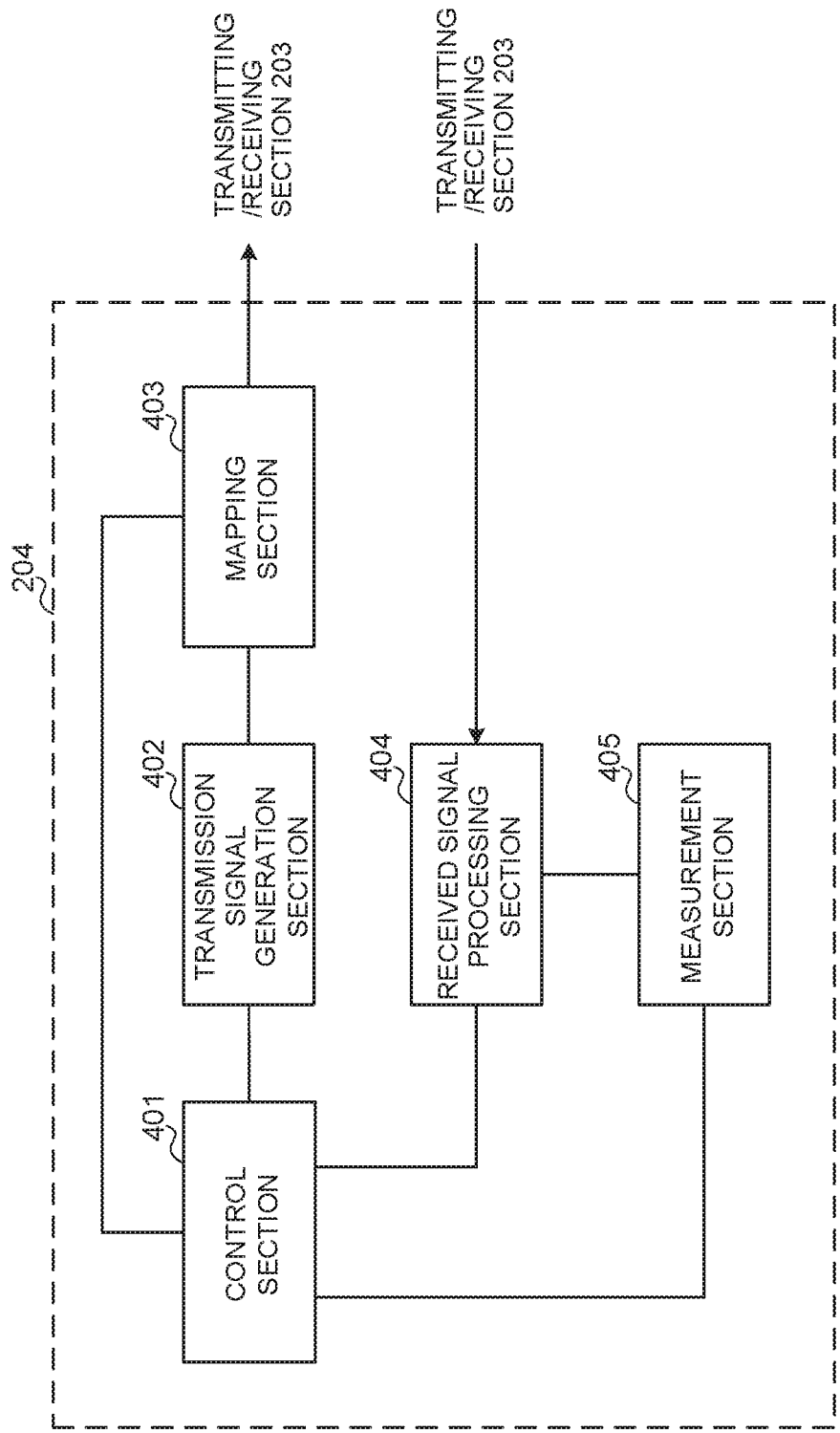
FIG. 16 is a diagram to show an exemplary functional structure of a user terminal according to one embodiment of the present invention.

FIG. 16 is a diagram to show an exemplary functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals in the mapping section 403, and so on. Furthermore, the control section 401 controls the signal receiving processes in the received signal processing section 404, the measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

Furthermore, when various kinds of information reported from the radio base station 10 are acquired via the received signal processing section 404, the control section 401 may update the parameters to use in control based on these pieces of information.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generation apparatus that can be described based on general understanding of the technical field to which the present invention pertains.

For example, the transmission information generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, etc.), the signal strength (for example, RSSI), transmission path information (for example, CSI), and so on. The measurement results may be output to the control section 401.

Also, the control section 401 may control the transmission and/or receipt using a specific frequency band based on at least one of a number of synchronization signal blocks. Also, the control section 401 may control transmission and/or receipt using a specific frequency band during random access procedures. Furthermore, the control section 401 may control the transmission and/or receipt of a reference signal in multiple frequency bands. The reference signal may be common with the reference signal for other user terminal in a specific frequency band in multiple frequency bands. Furthermore, the control section 401 may control the transmission and/or receipt of frequency location information, which indicates the frequency location of specific information with respect to at least one of the frequency locations of multiple synchronization signal blocks.

Also, the control section 401 may control transmission and/or receipt in multiple frequency bands (for example, multiple narrowband CCs) based on multiple specific signals transmitted respectively in multiple frequency bands in a specific frequency band after a random access procedure based on synchronization signal blocks. The plurality of frequency bands may be different from some frequency bands. One of the plurality of frequency bands may be the same as some frequency bands. Furthermore, the control section 401 may control the transmission and/or receipt of a reference signal in multiple frequency bands. The reference signal may be common with the reference signal for other user terminal (for example, a wideband CC UE) in a specific frequency band in multiple frequency bands. Also, the control section 401 may control the transmission/receipt of frequency location information, which indicates the location of specific information with respect to the location of a synchronization signal block.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting 2 or more physically and/or logically separate pieces of apparatus (via wire or wireless, for example) and using these multiple pieces of apparatus.

Figure 17:
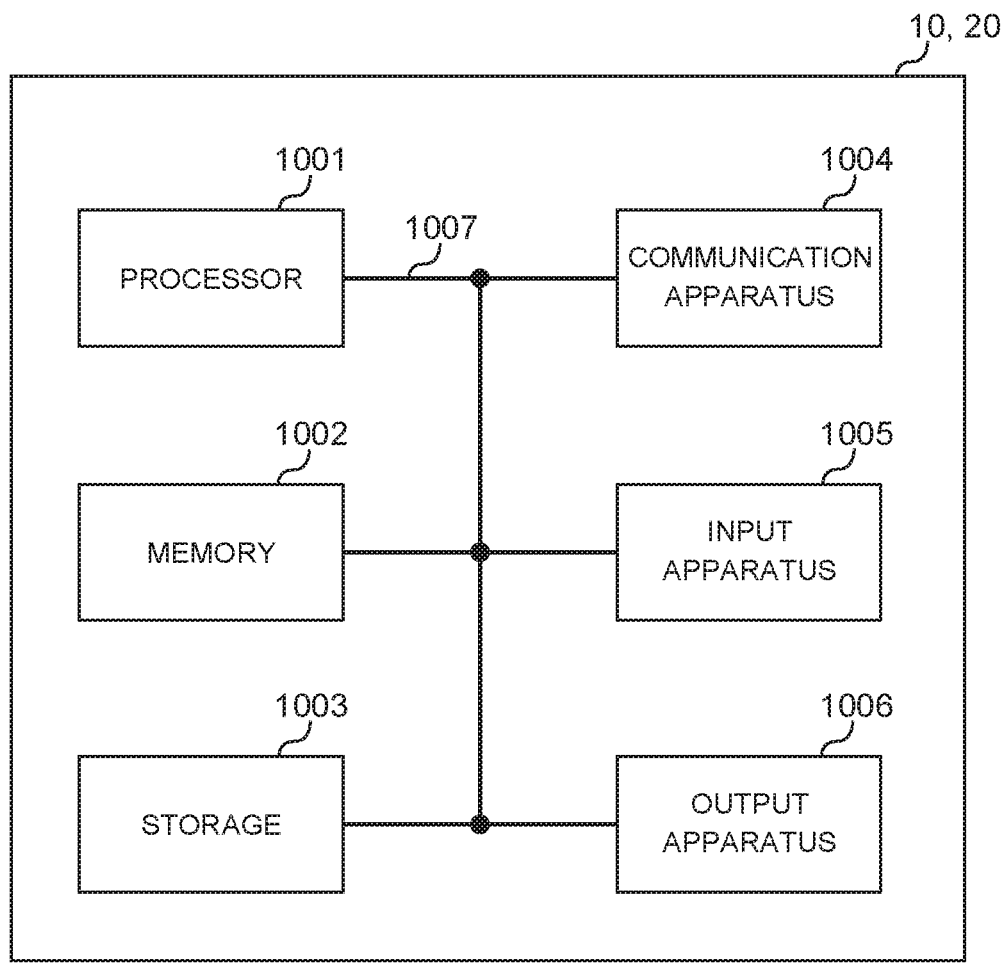
FIG. 17 is a diagram to show an exemplary hardware structure of a radio base station and a user terminal according to one embodiment of the present invention.

For example, the radio base station, user terminals and so on according to one embodiment of the present invention may function as a computer that executes the processes of the radio communication method of the present invention. FIG. 17 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with 1 processor, or processes may be implemented in sequence, or in different manners, on one or more processors. Note that the processor 1001 may be implemented with one or more chips.

The functions of the radio base station 10 and the user terminal 20 are implemented by allowing hardware such as the processor 1001 and the memory 1002 to read given software (programs), thereby allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that communicate the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or multiple slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be comprised of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, 1 subframe may be referred to as a "transmission time interval (TTI)," or a plurality of consecutive subframes may be referred to as a "TTI," or 1 slot or mini-slot may be referred to as a "TTI." That is, a subframe and/or a TTI may be a subframe (1 ms) in existing LTE, may be a shorter period than 1 ms (for example, 1 to 13 symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when 1 slot or 1 minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "partial TTI" (or a "fractional TTI"), a "shortened subframe," a "short subframe," a "mini-slot," a "sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 minislot, 1 subframe or 1 TTI in length. 1 TTI and 1 subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, 1 RE may be a radio resource field of 1 subcarrier and 1 symbol.

Note that the structures of radio frames, subframes, slots, minislots, symbols and so on described above are merely examples. For example, configurations pertaining to the number of subframes included in a radio frame, the number of slots included per subframe or radio frame, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to given values, or may be represented using other applicable information. For example, a radio resource may be specified by a given index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI)), higher layer signaling and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of given information (for example, reporting of information to the effect that "X holds") does not necessarily have to be sent explicitly, and can be sent in an implicit way (for example, by not reporting this piece of information, by reporting another piece of information, and so on).

Decisions may be made in values represented by 1 bit (0 or 1), may be made in Boolean values that represent true or false, or may be made by comparing numerical values (for example, comparison against a given value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between 2 or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between 2 or more elements, and may include the presence of one or more intermediate elements between 2 elements that are "connected" or "coupled" to each other. The coupling or connection between the elements may be physical, logical or a combination of these. For example, "connection" may be interpreted as "access."

As used herein, when 2 elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
a receiver that detects a first synchronization signal block including a synchronization signal and a physical broadcast channel, and receives, in a random access procedure based on the first synchronization signal block, a configuration information indicating at least one signal of a channel state information reference signal (CSI-RS) for tracking and a second synchronization signal block; and
a processor that controls reception of the at least one signal based on the configuration information,
wherein when the processor performs a radio resource management (RRM) measurement based on the second synchronization signal block and whole or part of the second synchronization signal block is not included in a band assigned to the terminal, the processor performs the RRM measurement with a measurement gap.

2. The terminal according to claim 1, rein the CSI-RS for tracking is in a partial band of a component carrier.

3. The terminal according to claim 2, wherein after a radio resource control (RRC) connection establishment, the processor reports a capability information indicating a bandwidth supported by UE.

4. The terminal according to claim 2, wherein the processor determines a relative frequency position of a resource for reception of a system information to a frequency position of the first synchronization signal block.

5. The terminal according to claim 2, wherein a frequency of the second synchronization signal block differs from a frequency of the first synchronization signal block.

6. The terminal according to claim 1, wherein after a radio resource control (RRC) connection establishment, the processor reports a capability information indicating a bandwidth supported by UE.

7. The terminal according to claim 6, wherein before the RRC connection establishment, the receiver receives a system information based on a minimum channel bandwidth.

8. The terminal according to claim 7, wherein the processor determines a relative frequency position of a resource for reception of a system information to a frequency position of the first synchronization signal block.

9. The terminal according to claim 6, wherein the processor determines a relative frequency position of a resource for reception of a system information to a frequency position of the first synchronization signal block.

10. The terminal according to claim 6, wherein a frequency of the second synchronization signal block differs from a frequency of the first synchronization signal block.

11. The terminal according to claim 1, wherein the processor determines a relative frequency position of a resource for reception of a system information to a frequency position of the first synchronization signal block.

12. The terminal according to claim 1, wherein a frequency of the second synchronization signal block differs from a frequency of the first synchronization signal block.

13. A radio communication method for a terminal comprising:
detecting a first synchronization signal block including a synchronization signal and a physical broadcast channel, and receiving, in a random access procedure based on the first synchronization signal block, a configuration information indicating at least one signal of a channel state information reference signal (CSI-RS) for tracking and a second synchronization signal block; and
controlling reception of the at least one signal based on the configuration information,
wherein when a radio resource management (RRM) measurement is based on the second synchronization signal block and whole or part of the second synchronization signal block is not included in a band assigned to the terminal, the terminal performs the RRM measurement with a measurement gap.

14. A base station comprising:
a transmitter that transmits a first synchronization signal block including a synchronization signal and a physical broadcast channel, and transmits, in a random access procedure based on the first synchronization signal block, a configuration information indicating at least one signal of a channel state information reference signal (CSI-RS) for tracking and a second synchronization signal block; and
a processor that controls transmission of the at least one signal based on the configuration information,
wherein when a radio resource management (RRM) measurement is based on the second synchronization signal block and whole or part of the second synchronization signal block is not included in a band assigned to a terminal, the RRM measurement is performed with a measurement gap.

15. A system comprising:
a terminal that comprises:
- a receiver that detects a first synchronization signal block including a synchronization signal and a physical broadcast channel, and receive, in a random access procedure based on the first synchronization signal block, a configuration information indicating at least one signal of a channel state information reference signal, CSI-RS, for tracking and a second synchronization signal block; and
- a first processor that controls reception of the at least one signal based on the configuration information,
- wherein when the first processor performs a radio resource management (RRM) measurement based on the second synchronization signal block and whole or part of the second synchronization signal block is not included in a band assigned to the terminal, the first processor performs the RRM measurement with a measurement gap; and a base station that comprises:
- a transmitter that transmits the first synchronization signal block and transmits the configuration information; and
- a second processor that controls transmission of the at least one signal.

* * * * *